US010760770B2

(12) United States Patent
Saarnio

(10) Patent No.: US 10,760,770 B2
(45) Date of Patent: Sep. 1, 2020

(54) DEVICE FOR MODIFYING LIGHT DISTRIBUTION

(71) Applicant: LEDIL OY, Salo (FI)

(72) Inventor: Olli Saarnio, Salo (FI)

(73) Assignee: LEDIL OY, Salo (FI)

( * ) Notice: Subject to any disclaimer, the term of this patent is extended or adjusted under 35 U.S.C. 154(b) by 0 days.

(21) Appl. No.: 16/473,232

(22) PCT Filed: Dec. 19, 2017

(86) PCT No.: PCT/FI2017/050909

§ 371 (c)(1),
(2) Date: Jun. 24, 2019

(87) PCT Pub. No.: WO2018/134472

PCT Pub. Date: Jul. 26, 2018

(65) Prior Publication Data

US 2019/0323682 A1 Oct. 24, 2019

(30) Foreign Application Priority Data

Jan. 19, 2017 (FI) ..................................... 20175038

(51) Int. Cl.
*F21V 7/24* (2018.01)
*F21V 5/04* (2006.01)
(Continued)

(52) U.S. Cl.
CPC .................. *F21V 7/24* (2018.02); *F21V 5/04* (2013.01); *F21V 7/0091* (2013.01); *F21Y 2115/10* (2016.08)

(58) Field of Classification Search
CPC .... G02B 19/0047–0071; G02B 3/0031; F21V 5/04–043; F21V 7/24; F21V 7/0091
See application file for complete search history.

(56) References Cited

U.S. PATENT DOCUMENTS 5,555,161 A 9/1996 Roe et al.
5,577,493 A 11/1996 Parkyn, Jr. et al.
(Continued)

FOREIGN PATENT DOCUMENTS

EP 2175193 A1 4/2010
EP 3037720 A1 6/2016
(Continued)

OTHER PUBLICATIONS

International search report (ISR), dated Mar. 29, 2018, from corresponding international application No. PCT/FI2017/050909.
(Continued)

*Primary Examiner* — Mariceli Santiago
(74) *Attorney, Agent, or Firm* — Nixon & Vanderhye

(57) ABSTRACT

A device for modifying light distribution includes a transparent body including a first surface, a second surface on an opposite side of the transparent body, and a third surface joining the first surface. The second surface defines a cavity opening away from the first surface. The second surface reflects, towards the third surface, at least a part of light received via the first surface. The third surface reflects, towards the second surface, the light reflected from the second surface. The second surface acts as a light egress surface for the light reflected from the third surface. The third surface includes a groove so that a part of the light reflected from the second surface propagates across the groove prior to being reflected from the third surface. The light distribution can be tuned by adjusting the shape, the size, and/or the location of the groove.

20 Claims, 6 Drawing Sheets

(51) Int. Cl.

| | |
|---|---|
| ***F21V 7/00*** | (2006.01) |
| ***F21Y 115/10*** | (2016.01) |

(56) References Cited

U.S. PATENT DOCUMENTS

| | | | | |
|---|---|---|---|---|
| 6,724,543 | B1 * | 4/2004 | Chinniah | F21V 5/008 359/718 |
| 7,270,454 | B2 * | 9/2007 | Amano | F21S 48/215 362/328 |
| 10,502,392 | B2 * | 12/2019 | Schwalenberg | F21V 5/008 |
| 2006/0268576 | A1 | 11/2006 | Matsui et al. | |
| 2009/0321765 | A1 | 12/2009 | Chang | |
| 2010/0135028 | A1 | 6/2010 | Kokubo | |
| 2010/0177526 | A1 * | 7/2010 | Futami | F21V 7/0091 362/519 |
| 2013/0163258 | A1 | 6/2013 | Tang | |
| 2013/0194795 | A1 | 8/2013 | Onaka et al. | |
| 2014/0247592 | A1 | 9/2014 | Hukkanen et al. | |
| 2015/0124460 | A1 | 5/2015 | Zhang et al. | |
| 2017/0115531 | A1 | 4/2017 | Hiraka | |
| 2017/0246767 | A1 | 8/2017 | Hukkanen | |
| 2017/0307172 | A1 * | 10/2017 | Liu | F21V 5/048 |
| 2018/0052259 | A1 * | 2/2018 | Chang | G02B 19/0061 |
| 2018/0245770 | A1 * | 8/2018 | Mochida | F21V 5/045 |
| 2019/0235319 | A1 * | 8/2019 | Zhang | G02B 27/0955 |

FOREIGN PATENT DOCUMENTS

| | | | |
|---|---|---|---|
| JP | 2011034770 | A | 2/2011 |
| JP | 2015191838 | A | 11/2015 |
| WO | 0107828 | A1 | 2/2001 |
| WO | 2011007733 | A1 | 1/2011 |
| WO | 2012171439 | A1 | 12/2012 |
| WO | 2015133233 | A1 | 9/2015 |
| WO | 2015151675 | A1 | 10/2015 |
| WO | 2016034761 | A1 | 3/2016 |

OTHER PUBLICATIONS

Finnish search report (FI-SR), dated Jun. 14, 2017, from priority application No. FI 20175038.

* cited by examiner

DEVICE FOR MODIFYING LIGHT DISTRIBUTION

FIELD OF THE DISCLOSURE

The disclosure relates generally to illuminating engineering. More particularly, the disclosure relates to a device for modifying distribution of light produced by a light source that can be, for example but not necessarily, a light emitting diode "LED".

BACKGROUND

Distribution of light produced by a light source can be important or even critical in some applications. The light source can be, for example but not necessarily, a light emitting diode "LED", a filament lamp, or a gas-discharge lamp. FIG. 1 shows a section view of an exemplifying device 101 according to the prior art for modifying the distribution of light produced by a light source 102. The section plane is parallel with the xz-plane of a coordinate system 199. The device 101 comprises a transparent body 103 that is made of transparent material such as for example acrylic plastic, polycarbonate, optical silicone, or glass. The transparent body 103 can be rotationally symmetric with respect to a geometric line 125. It is, however, also possible that the transparent body 103 has a non-circular shape when seen along the z-axis of the coordinate system 199. The transparent body 103 comprises a first surface 104 that acts as a light ingress surface, a second surface 105 that acts as a light egress surface, and a third surface 106 that constitutes a zone around the first surface and joins the first surface. The second 105 surface is configured to reflect, towards the third surface 106, at least a part of light received via the first surface from the light source 102. The third surface 106 is configured to reflect, towards the second surface 105, the light reflected from the second surface so that the light penetrates the second surface 105. In FIG. 1, some of the light beams produced by the light source 102 are depicted with dashed line arrows.

In many cases, there is a need to design a device of the kind illustrated in FIG. 1 so that a combination of a light source and the device produces a desired illumination pattern on a surface being illuminated. For example, there might be a desire to avoid ring-shaped areas having higher and lower light intensities in the above-mentioned illumination pattern. An inherent challenge related to devices of the kind illustrated in FIG. 1 is that the above-mentioned second and third surfaces 105 and 106 have to be shaped so that the condition for total internal reflection "TIR" is fulfilled at all locations on the third surface 106 because light should not leak out through the third surface 106. This requirement limits the freedom to design the shapes of the second and third surfaces 105 and 106, and thereby there may be a need for compromises.

SUMMARY

The following presents a simplified summary in order to provide a basic understanding of some aspects of various embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric line, a geometric plane, a non-planar geometric surface, a geometric room, or any other geometric entity that is one, two, or three dimensional.

In accordance with the invention, there is provided a new device for modifying the distribution of light produced by a light source. A device according to the invention comprises a transparent body made of transparent material having refractive index greater than one. The transparent body comprises a first surface, a second surface on an opposite side of the transparent body with respect to the first surface, and at least one third surface joining the first surface, wherein:

- the second surface defines a cavity opening away from the first surface,
- the second surface is configured to reflect, towards the third surface, at least a part of light received via the first surface,
- the third surface is configured to reflect, towards the second surface, the light reflected from the second surface,
- the second surface is configured to act as a light egress surface for the light reflected from the third surface, and
- the third surface comprises at least one groove on a propagation path of a part of the light reflected from the second surface so that the part of the light reflected from the second surface propagates across the groove prior to being reflected from the third surface.

Distribution of light that exits the transparent body via the above-mentioned second surface can be tuned by adjusting the shape, the size, and/or the location of the at least one groove. Therefore, the at least one groove increases the degrees of freedom when designing the device in order to achieve a desired light distribution pattern.

In accordance with the invention, there is provided also a new illuminator system comprising at least one light source and at least one device according to the invention for modifying the distribution of light produced by each light source. Each light source can be, for example, a light emitting diode "LED", a filament lamp, or a gas-discharge lamp.

In accordance with the invention, there is provided also a new mold having a form suitable for manufacturing, by mold casting, a piece of solid material, e.g. plastic, having a shape of a device according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which:

FIG. 1 has already been explained in the Background-section of this document.

DESCRIPTION OF EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
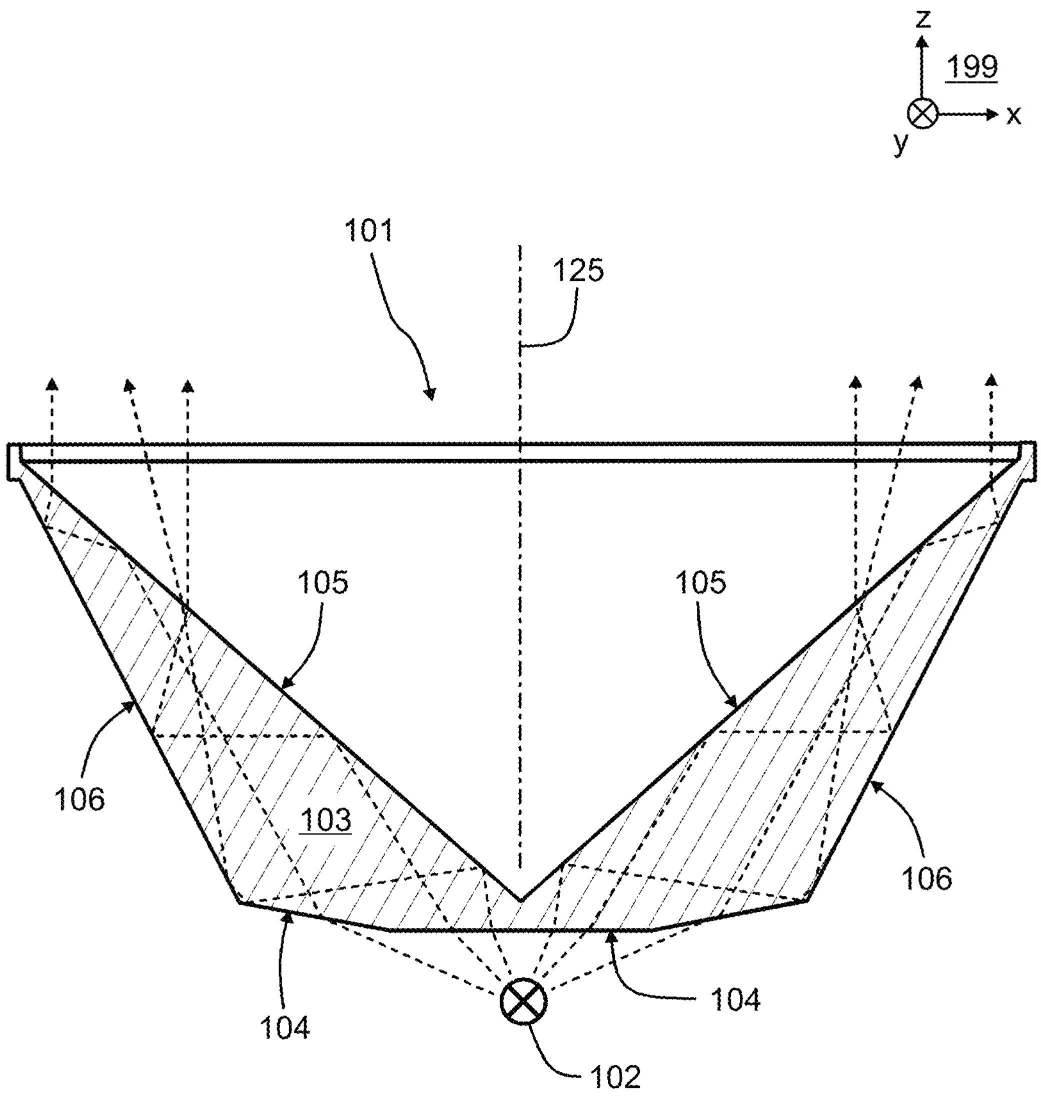
Figure 1 Prior art
FIG. 1 illustrates a device according to the prior art for modifying light distribution.
Figure 2A:
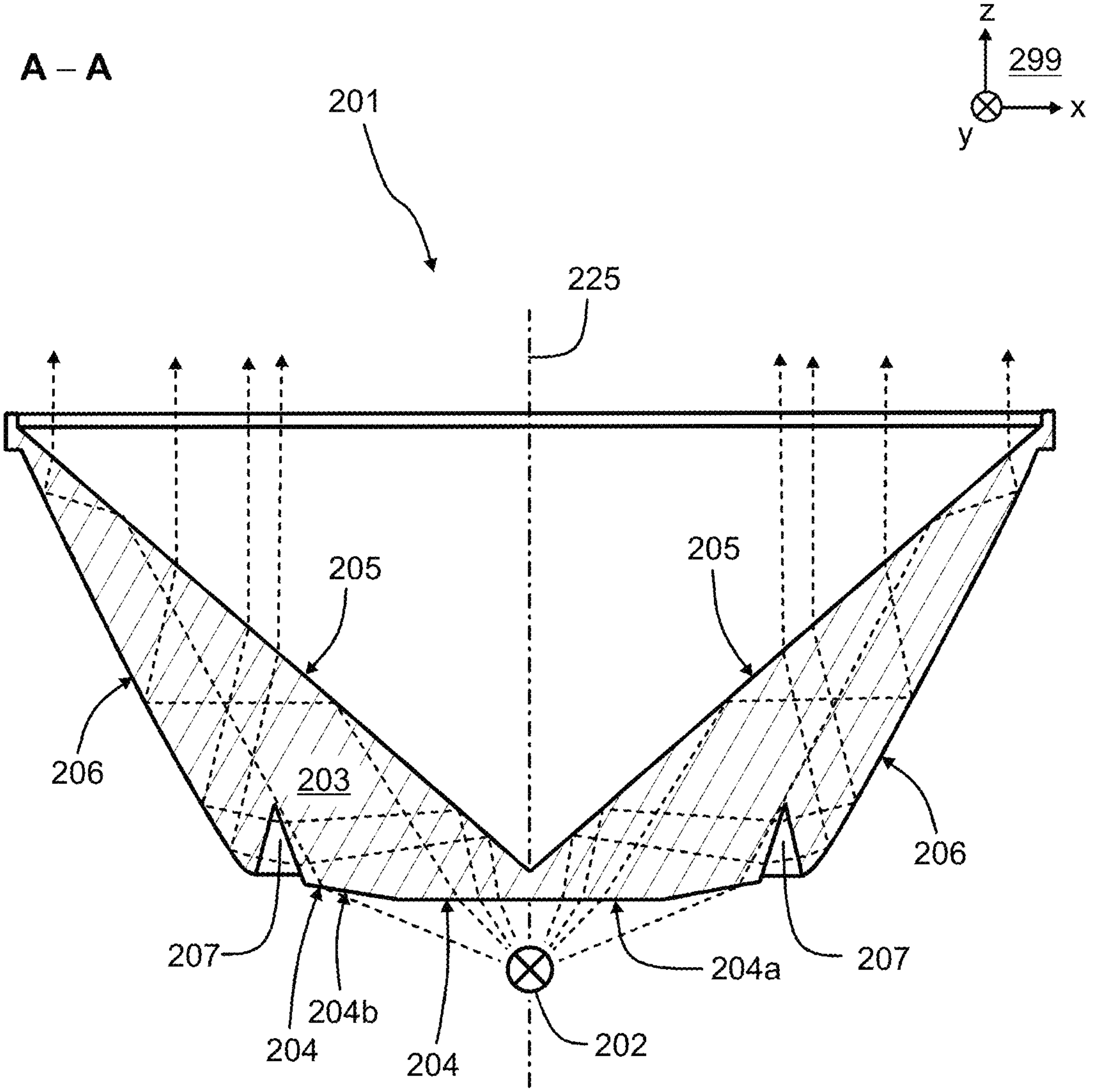
FIGS. 2*a* and 2*b* illustrate a device according to an exemplifying and non-limiting embodiment of the invention for modifying light distribution.

FIG. 2*a* shows a section view of a device 201 according to an exemplifying and non-limiting embodiment of the invention for modifying the distribution of light emitted by a light source 202. The light source 202 can be, for example but not necessarily, a light emitting diode "LED", a filament lamp, or a gas-discharge lamp. The section shown in FIG. 2*a* has been taken along a line A-A shown in FIG. 2*b* which shows the device 201 when seen along the positive z-direction of a coordinate system 299. The section plane is parallel with the xz-plane of the coordinate system 299. The device 201 comprises a transparent body 203 made of transparent material having refractive index greater than one. The transparent material can be for example acrylic plastic, polycarbonate, optical silicone, or glass. The method of manufacture of the transparent body 203 can be for example mold casting. In the exemplifying case illustrated in FIGS. 2*a* and 2*b*, the transparent body 203 is rotationally symmetric with respect to a geometric axis 225 that is parallel with the z-axis of the coordinate system 299. It is, however, also possible that the transparent body of a device according to another embodiment of the invention has a non-circular shape when seen along the z-axis of the coordinate system 299. Furthermore, it is also possible that at least a part of the transparent body of a device according to an embodiment of the invention has substantially a same cross-sectional shape on the whole length of the above-mentioned part of the transparent body. The cross-sectional shape can be for example similar to the shape of the section shown in FIG. 2*a*.

Figure 2B:
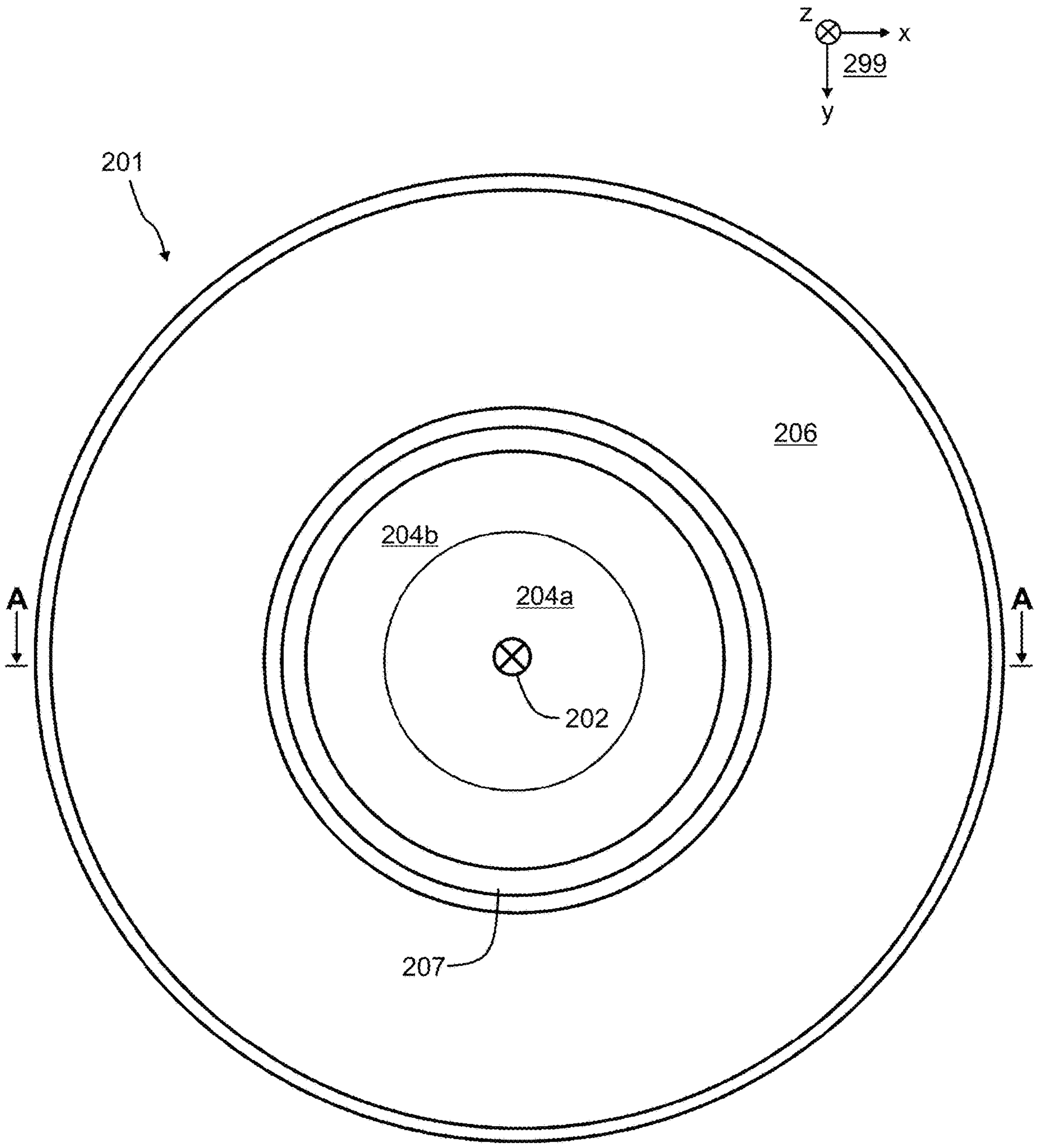

The transparent body 203 comprises a first surface 204, a second surface 205, and a third surface 206 joining the first surface 204. The first surface 204 and the second surface 205 are located on opposite sides of the transparent body 203. As shown in FIG. 2*a*, the second surface 205 defines a cavity that opens away from the first surface 204. In FIG. 2*a*, some of the light beams produced by the light source 202 are depicted with dashed line arrows. As illustrated with the dashed line arrows, the second surface 205 is configured to reflect, towards the third surface 206, at least a part of light received via the first surface 204. The third surface 206 is configured to reflect, towards the second surface 205, the light reflected from the second surface. The second surface 205 is configured to act as a light egress surface for the light reflected from the third surface 206. The third surface 206 comprises a groove 207. As illustrated in FIG. 2*a*, a part of the light reflected from the second surface 205 propagates across the groove 207 prior to being reflected from the third surface 206. In this exemplifying case where the transparent body 203 is rotationally symmetric, the groove 207 is circular as illustrated in FIG. 2*b*. It is also possible that the third surface 203 is provided with two or more grooves. Distribution of light that exits the transparent body 203 via the second surface 205 can be tuned by adjusting the shape, the size, and/or the location of the one or more grooves on the third surface 206. Thus, the one or more grooves increase the degrees of freedom when designing the transparent body 203 in order to achieve a desired light distribution pattern.

In the exemplifying device 201 illustrated in FIGS. 2*a* and 2*b*, the cross-sectional profile of the groove 207 is substantially V-shaped. Depending on a desired light distribution pattern, it is however also possible that the cross-sectional profile of the groove needs to have another shape in order to achieve the desired light distribution pattern. For example, the groove could have a U-shaped cross-sectional profile.

Figure 3:
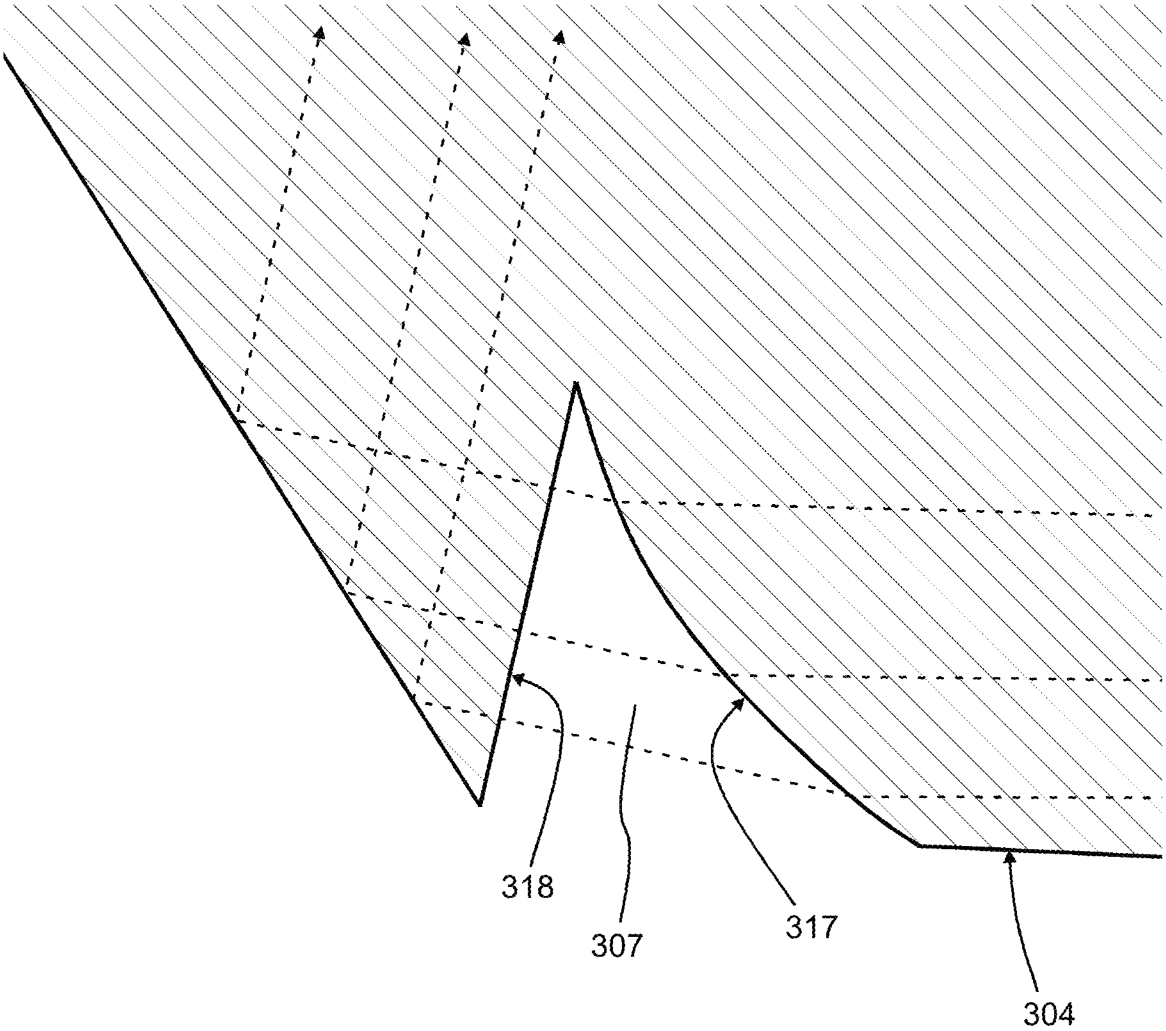
FIG. 3 illustrates a detail of a device according to another exemplifying and non-limiting embodiment of the invention for modifying light distribution.

FIG. 3 illustrates a groove 307 of a device according to an exemplifying and non-limiting embodiment of the invention for modifying light distribution. In FIG. 3, exemplifying light beams which propagate across the groove 307 are depicted with dashed line arrows. In this exemplifying case, the cross-sectional profile of the groove 307 has a substantially V-shaped bottom region, a first wall 317 of the groove which is closer to the first surface 304 has an arched cross-sectional profile so that the first wall 317 is convex, and a second wall 318 of the groove 307 which is farther from the first surface 304 has a substantially straight cross-sectional profile. It is also possible that both of the first and second walls of the groove have arched cross-sectional profiles so that the first and second walls are convex, or that the second wall which is farther from the first surface 304 has an arched cross-sectional profile so that the second wall is convex and the first wall which is closer to the first surface 304 has a substantially straight cross-sectional profile.

In the exemplifying device 201 illustrated in FIGS. 2*a* and 2*b*, the cavity defined by the second surface 205 is substantially conical. Depending on a desired light distribution pattern, it is however also possible that the cavity needs to have a non-conical shape in order to achieve the desired light distribution pattern. A non-conical shape can be e.g. a shape of a paraboloid.

In the exemplifying device 201 illustrated in FIGS. 2*a* and 2*b*, the first surface 204 has a substantially planar center zone 204*a* and a surrounding zone 204*b* defining a truncated cone whose coning angle opens towards the second surface 205. It is also possible that the first surface is designed to comprise e.g. a cavity for acting as a place for the light source 202.

The above-described device 201 and the light source 202 constitute an illuminator system according to an embodiment of the invention. The illuminator system further comprises mechanical support structures for supporting the device 201 and the light source 202. The mechanical support structures are not shown in FIGS. 2*a* and 2*b*. An illuminator system according to another embodiment of the invention may comprise for example an elongated device according to an embodiment of the invention for modifying the distribution of light emitted by an elongated light source or by a set of point-form light sources placed on a same geometric line. The cross-sectional shape of the transparent body of the elongated device can be e.g. similar to the shape of the section shown in FIG. 2*a*.

Figure 4:
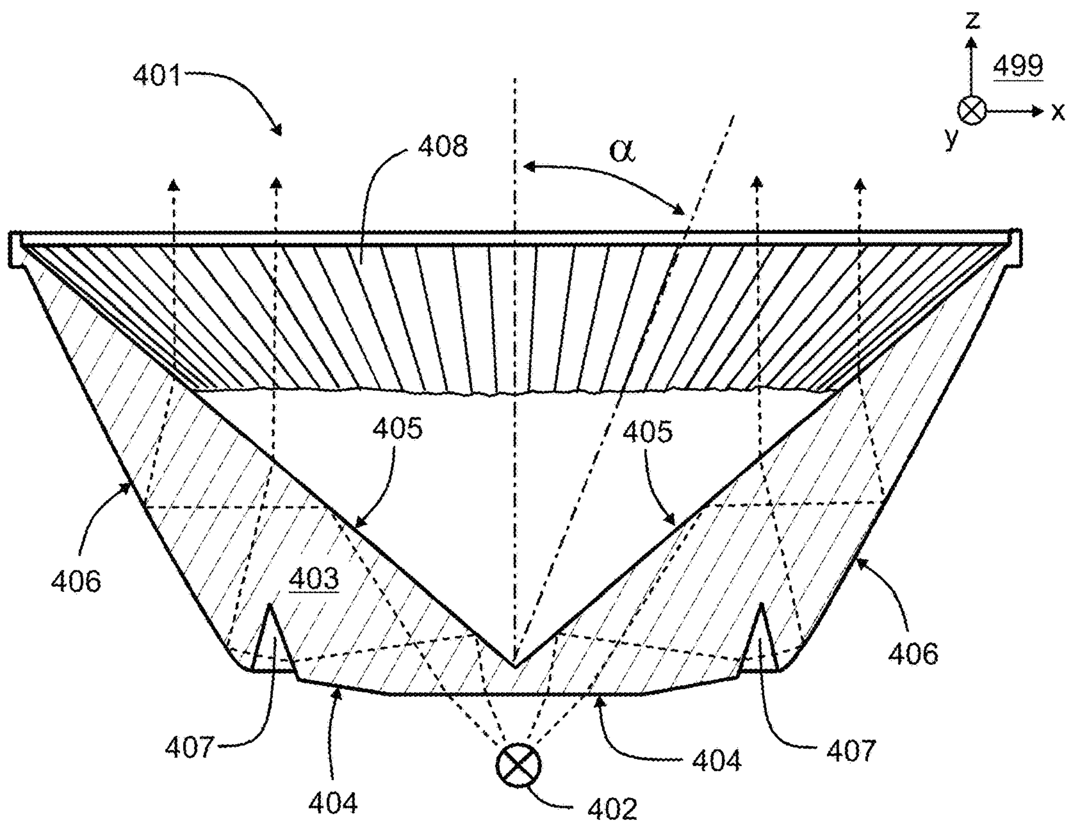
FIG. 4 illustrates a device according to an exemplifying and non-limiting embodiment of the invention for modifying light distribution.

FIG. 4 shows a section view of a device 401 according to an exemplifying and non-limiting embodiment of the invention for modifying the distribution of light emitted by a light source 402. The section plane is parallel with the xz-plane of a coordinate system 499. In FIG. 4, some of the light beams produced by the light source 402 are depicted with dashed line arrows. The device 401 comprises a transparent body 403 made of transparent material having refractive index greater than one. The transparent body 403 comprises a first surface 404, a second surface 405, and a third surface 406 joining the first surface 404. The first surface 404 and the second surface 405 are located on opposite sides of the transparent body 403. The third surface 406 comprises a groove 407 so that a part of the light reflected from the second surface 405 propagates across the groove 407 prior to being reflected from the third surface 406.

In the exemplifying device 401 illustrated in FIG. 4, a part of the second surface 405 comprises undulations 408 suitable for modifying the distribution of light that penetrates the above-mentioned part of the second surface 405. The undulations may comprise converging and diverging deviations from a smooth shape so that the surface provided with the undulations is a color mixing surface. In a color mixing surface, light beams exhibiting different wavelengths are effectively mixed thus producing a light distribution pattern which contains all wavelengths evenly distributed across the light distribution pattern. In the exemplifying case illustrated in FIG. 4, the undulations 408 are grooves and ridges between the grooves, where the grooves and ridges extend from the edge of the second surface 405 towards the bottom of the conical cavity defined by the second surface 405.

Figure 5A:
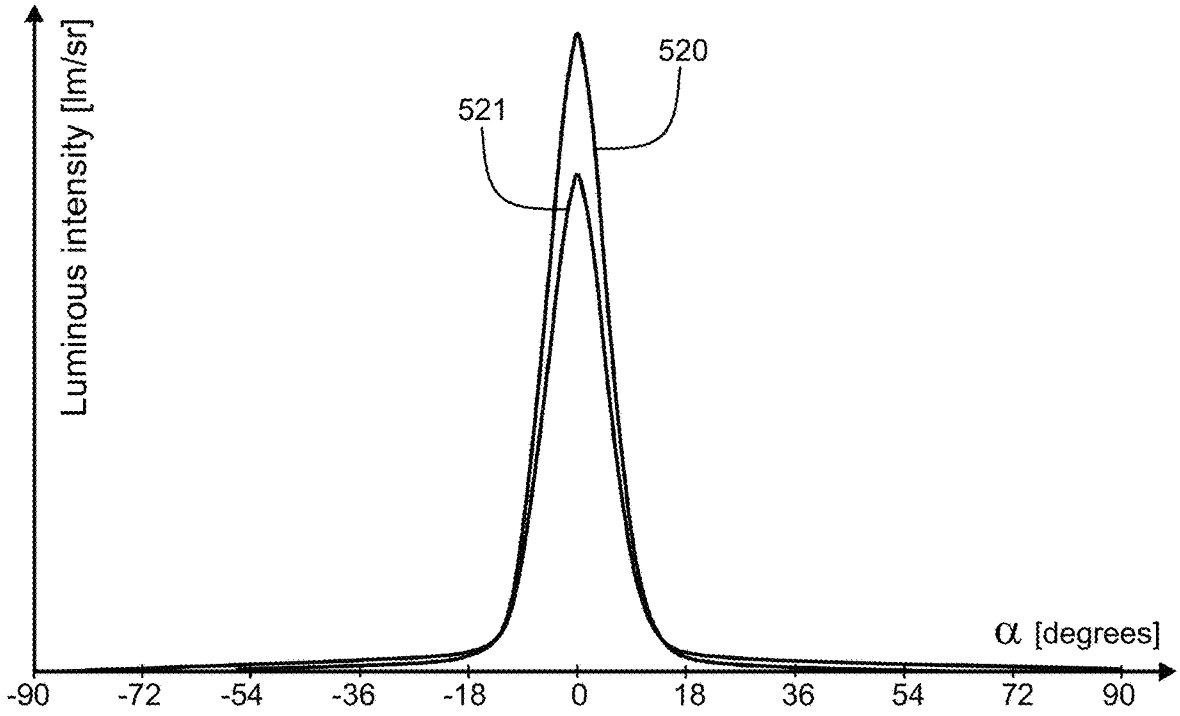
FIGS. 5*a* and 5*b* illustrate operation of a device according to an exemplifying and non-limiting embodiment of the invention for modifying light distribution.
Figure 5B:
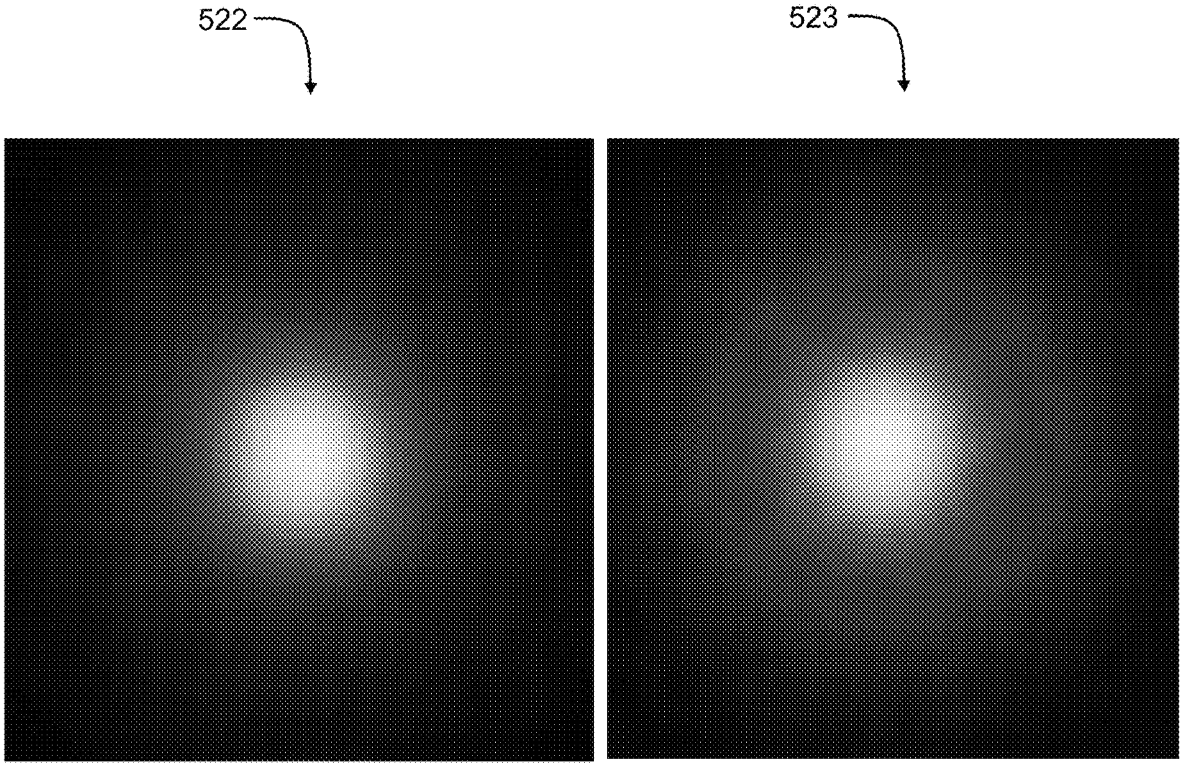

FIGS. 5*a* and 5*b* illustrate a functional difference between a first device which is similar to the above-described device 401 and a second device which is otherwise similar to the first device but there is no groove similar to the groove 407. In FIG. 5*a*, curves 520 and 521 present luminous intensities, i.e. luminous power per a unit solid angle, as functions of a polar angle $\alpha$ that is illustrated in FIG. 4. The curve 520 presents the luminous intensity in a first case where the first device modifies the distribution of light emitted by a light source, and the curve 521 shows the luminous intensity in a second case where the second device modifies the distribution of light emitted by the same light source or by a similar light source. As can be seen, the luminous intensity in the positive z-direction of the coordinate system 499, i.e. $\alpha=0$, is significantly higher when using the first device having the groove than when using the second device which does not have a groove. When using the first device, the surfaces of the groove change the propagation direction of light which propagates across the groove and thereby less light leaks out trough surfaces on which total internal reflection "TIR" is meant to take place. Thus, the efficiency of the first device is higher than that of the second device. FIG. 5*b* illustrates an illumination pattern 522 produced on a planar surface by using the first device and a corresponding illumination pattern 523 produced on a planar surface by using the second device. As can be seen, the illumination pattern 523 has a ring-shaped area having a local intensity maximum whereas the illumination pattern 522 is practically free from such ring-shaped areas.

The specific examples provided in the description given above should not be construed as limiting the scope and/or the applicability of the appended claims. Lists and groups of examples provided in the description given above are not exhaustive unless otherwise explicitly stated.

What is claimed is:

1. A device for modifying light distribution, the device comprising a transparent body made of transparent material having refractive index greater than one, and the transparent body comprising a first surface, a second surface on an opposite side of the transparent body with respect to the first surface, and at least one third surface joining the first surface, wherein:

the second surface defines a cavity opening away from the first surface, the second surface is configured to reflect, towards the third surface, at least a part of light received via the first surface, the third surface is configured to reflect, towards the second surface, the light reflected from the second surface, and the second surface is configured to act as a light egress surface for the light reflected from the third surface, wherein the third surface comprises at least one groove on a propagation path of a part of the light reflected from the second surface so that the part of the light reflected from the second surface propagates across the groove prior to being reflected from the third surface.

2. The device according to claim 1, wherein the transparent body is substantially rotationally symmetric.

3. The device according to claim 1, wherein the cavity defined by the second surface is substantially conical.

4. The device according to claim 1, wherein the first surface has a substantially planar center zone and a surrounding zone defining a truncated cone whose coning angle opens towards the second surface.

5. The device according to claim 1, wherein a cross-sectional profile of the groove is substantially V-shaped.

6. The device according to claim 1, wherein a cross-sectional profile of the groove has a substantially V-shaped bottom region, a first wall of the groove which is closer to the first surface has an arched cross-sectional profile so that the first wall is convex, and a second wall of the groove which is farther from the first surface has a substantially straight cross-sectional profile.

7. The device according to claim 1, wherein at least a part of the second surface comprises undulations suitable for modifying a distribution of light penetrating the at least part of the second surface.

8. The device according to claim 7, wherein the undulations are grooves and ridges between the grooves, the grooves and the ridges extending from an edge of the second surface towards a bottom of the cavity defined by the second surface.

9. The device according to claim 1, wherein the transparent material is one of the following: acrylic plastic, polycarbonate, optical silicone, glass.

10. A mold having a form suitable for manufacturing, by mold casting, a piece of transparent material having a shape of a device according to claim 1.

11. The device according to claim 2, wherein the cavity defined by the second surface is substantially conical.

12. The device according to claim 2, wherein the first surface has a substantially planar center zone and a surrounding zone defining a truncated cone whose coning angle opens towards the second surface.

13. The device according to claim 2, wherein a cross-sectional profile of the groove is substantially V-shaped.

14. The device according to claim 2, wherein a cross-sectional profile of the groove has a substantially V-shaped bottom region, a first wall of the groove which is closer to the first surface has an arched cross-sectional profile so that the first wall is convex, and a second wall of the groove which is farther from the first surface has a substantially straight cross-sectional profile.

15. The device according to claim 2, wherein at least a part of the second surface comprises undulations suitable for modifying a distribution of light penetrating the at least part of the second surface.

16. The device according to claim 15, wherein the undulations are grooves and ridges between the grooves, the grooves and the ridges extending from an edge of the second surface towards a bottom of the cavity defined by the second surface.

17. The device according to claim 3, wherein at least a part of the second surface comprises undulations suitable for modifying a distribution of light penetrating the at least part of the second surface.

18. The device according to claim 4, wherein at least a part of the second surface comprises undulations suitable for modifying a distribution of light penetrating the at least part of the second surface.

19. An illuminator system comprising:

at least one light source, and at least one device for modifying distribution of light emitted by the at least one light source, the device comprising a transparent body made of transparent material having refractive index greater than one, and the transparent body comprising a first surface, a second surface on an opposite side of the transparent body with respect to the first surface, and at least one third surface joining the first surface, wherein:

the second surface defines a cavity opening away from the first surface, the second surface is configured to reflect, towards the third surface, at least a part of the light received via the first surface, the third surface is configured to reflect, towards the second surface, the light reflected from the second surface, and the second surface is configured to act as a light egress surface for the light reflected from the third surface, wherein the third surface comprises at least one groove on a propagation path of a part of the light reflected from the second surface so that the part of the light reflected from the second surface propagates across the groove prior to being reflected from the third surface.

20. The illuminator system according to claim 19, wherein the transparent body is substantially rotationally symmetric.

* * * * *